Nov. 19, 1968 J. M. HUNT ET AL 3,412,240

LINEAR INTERPOLATER

Filed Feb. 21, 1963 3 Sheets-Sheet 1

INVENTORS:
JOHN M. HUNT
JOHN KAUFMANN
HAROLD R. DELL

BY Edward A. Robinson

ATTORNEY

INVENTORS:
JOHN M. HUNT
JOHN KAUFMANN
HAROLD R. DELL
BY
Edward A. Robinson
ATTORNEY INVENTORS:
JOHN M. HUNT
JOHN KAUFMANN
HAROLD R. DELL
BY
Edward A. Robinson
ATTORNEY United States Patent Office 3,412,240

Patented Nov. 19, 1968

3,412,240

LINEAR INTERPOLATER

John M. Hunt, Hillcrest, N.Y., and John Kaufmann, Sunnyvale, and Harold R. Dell, Palo Alto, Calif., assignors to General Precision Systems Inc., a corporation of Delaware Filed Feb. 21, 1963, Ser. No. 260,160
17 Claims. (Cl. 235—164)

This invention relates to electronic computers, and more particularly, to circuits for generating output signals corresponding to mathematical or empirical functions of input quantities represented by digital input signals.

Electronic computing apparatus may be classified generally into two basic types: analog and digital. An analog circuit provides an "analogy" between quantities undergoing computation and electrical voltages (or currents) which may exist at points in the circuit. Digital circuits pass coded combinations of signals representative of digital numbers. Analog systems have an advantage of providing very fast computations, but the degree of accuracy obtainable in analog systems depends upon the quality and accuracy of circuit components, input voltage levels, and the like. Ordinarily, analog computers may be designed for an accuracy of .1% which represents an error of one part in 1,000. If it is necessary to have greater accuracy from analog systems, a considerable expense must be incurred to improve the circuits. Digital computers may perform computations to any desired degree of accuracy, however, the digital computations require greater time and therefore, digital computers are usually much slower than analog computers.

Some special purpose computers such as aircraft simulators may require an output signal representing a function such as the thrust of an engine which is a function of several different independent quantities such as fuel intake, mach number, ambient temperature and pressure, etc. Such a function dependent upon several variables may be more conveniently generated with a desired degree of accuracy by digital means rather than analog means. Thus, an aircraft simulator may compute function values digitally, and then use a digital to analog signal conversion technique for providing an accurate analog output signal.

In a co-pending patent application entitled "Digital Function Generator" Serial No. 87,337, filed on February 6, 1961, by John Kaufmann and Harold Dell, now Patent No. 3,247,365 and assigned to the same assignee as the instant application, there is disclosed a system for generating functions digitally from data representative of function curves which are stored point by point in a magnetic drum arrangement. The digital function generator of this co-pending patent application discloses apparatus for reproducing the desired function from the drum, and for comparing the independent input quantity with the independent variable on a point by point basis to obtain bracketing points of the input quantity. By definition, the bracketing points of the function curve are those recorded values which most closely approximate the value of the input quantity, such that the independent abscissa quantity of one bracketing point is equal to or less then the input quantity while the independent quantity of the other bracketing point is greater than the input quantity. Thus $$x_n \leq x < x_{n+1}$$

where $x_n$ and $x_{n+1}$ are values of the points that bracket the input quantity, $x$. In other words, the input quantity $x$ lies between the bracketing points of the function curve (except for the special case where $x_n = x$). The digital function generator of the co-pending patent application of Kaufmann and Dell computed the desired output function from a general interpolation equation:

$$f(x) = \frac{x - x_n}{x_{n+1} - x_n}[f(x_{n+1}) - f(x_n)] + f(x_n)$$

where $f(x_{n+1})$ are the function values corresponding to the respective bracketing values $x_n$ and $x_{n+1}$ of the independent variable. The prior digital function generator solved the above equation with three initial subtractions, a division, a multiplication, and a final addition. All of these arithmetic operations were accomplished in addition to successive comparisons for obtaining the two points of the function which bracket the input quantity.

It is an object of this invention to provide an improved method and means for generating output signals representative of quantities which have a predetermined mathematical or empirical functional relation to independent quantities represented by digital input signals.

A further object is to provide an improved method and system for reproducing the bracketing points from a function curve corresponding to an input signal, and for interpolating to obtain an output signal therefrom.

Another object of this invention is to provide an improved method and apparatus for solving an interpolation formula:

$$f(x) = f(x_{n+1}) \cdot (x - x_n) + f(x_n) \cdot [(1 - 1/2^m) - (x - x_n)] + f(x_n) \cdot 1/2^m$$

and more specifically, it is an object to provide a method and means for performing an interpolation using two multiplicand quantities and a multiplier quantity wherein two multiplications and an addition may be performed simultaneously such that the output signal may be obtained in a minimum of time, and with the use of economical circuitry.

Numerous other objects and advantages will be apparent throughout the progress of the specification which follows. The accompanying drawings illustrate a certain exemplary embodiment of the invention and the views therein are as follows.

Figure 1:
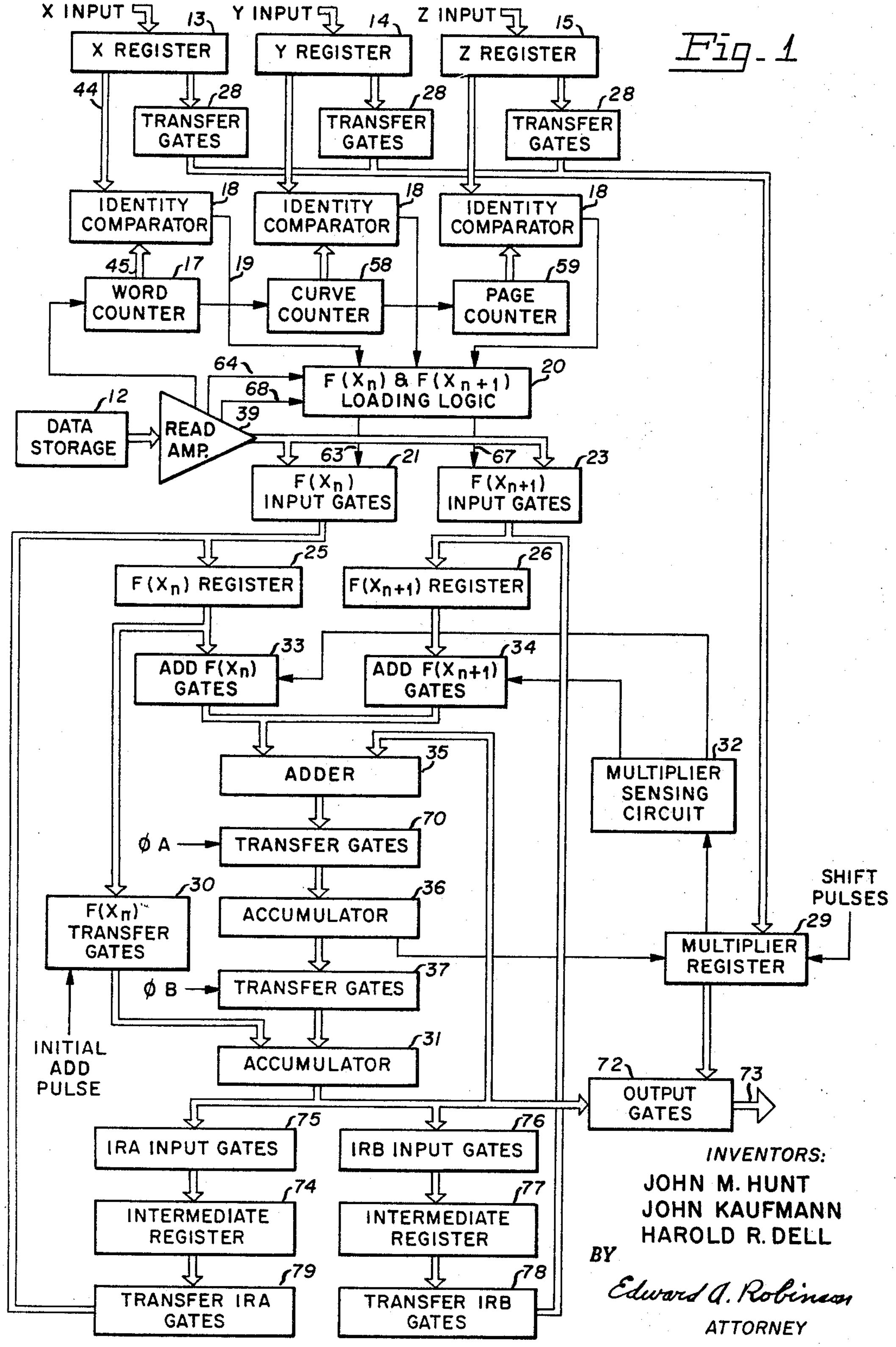
FIGURE 1 is a circuit diagram of an interpolation arithmetic unit for a computer built in accordance with the teachings of this invention.
Figure 2:
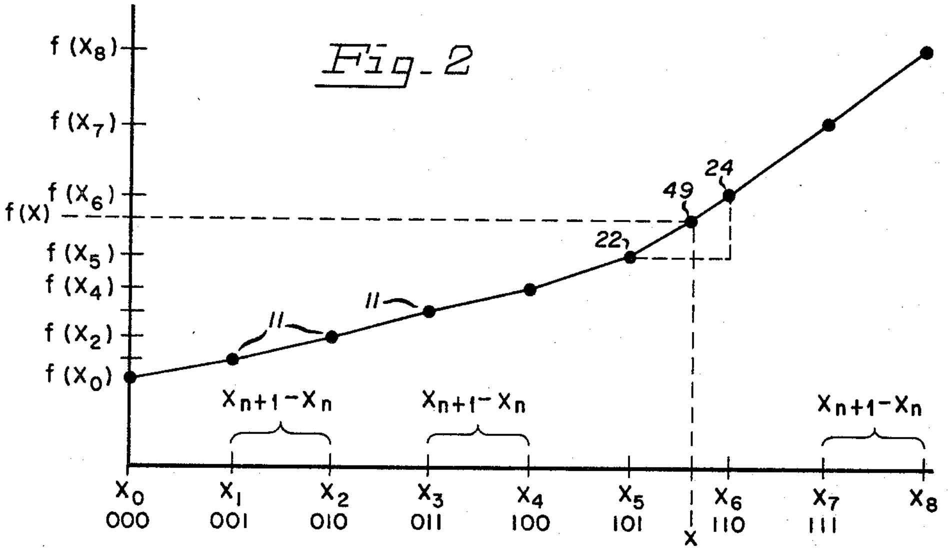
FIGURE 2 is a graphical representation of a function of one variable illustrating the relation between the stored point values, an input quantity, and a desired output function quantity.

Briefly stated, according to a preferred embodiment of this invention, digital signals representative of various points 11 of function curves (FIGURES 2 and 3) are stored in a magnetic drum or other large capacity data storage arrangement 12 (FIGURE 1). Input signals representative of $x$, $y$, $z$ values of the independent variables are entered into registers 13, 14 and 15. Data representing the function curves are stored point by point, and the values of the dependent variables, $x_0$, $x_1$, $x_2$ etc. are so chosen that the points are equally spaced along the abscissa. As shown in FIGURE 2, nine such points may be stored whereby the curve will be broken into eight segments equally spaced along the $x$ axis. The input quantity contained in the $x$ register 13 is binary coded, and is representative of a particular $x$ value within the useful range of the function curve between $x_0$ and $x_8$. It may be appreciated that the three most significant binary digits of the $x$ input quantity will therefore define a particular segment of the function curve. As the storage drum 12 revolves the various points 11 of the function curve are counted by a word counter 17. An identity comparison circuit 18 compares the state of the word counting circuit 17 with the three most significant bits of the $x$ input quantity from the register 13. When an identity is established between the word counter 17 and the three most significant bits of the input quantity, a signal is passed via a lead 19 to loading logic circuits 20 whereupon a first set of input gates 21 is conditioned to pass the data representative of a first bracketing point 22 of the function curve; and a second set of input gates 23 is next subsequently conditioned to pass data from the second bracketing point of the function curve 24. Thus, it may be appreciated that signals representative of the bracketing values of the function curve will be stored in a pair of registers 25 and 26.

While the most significant binary digits from the input registers 13, 14 and 15 are used for determining the bracketing function points by the identity comparators 18, the other digts of lesser significance are passed via transfer gates 28 to a multiplier register 29. The interpolation computation may be accomplished by coupling the register 25 via transfer gates 30 to an accumulator 31 first, whereby signals representing the first bracketing function value, $f(x_n)$, will be entered into the accumulator 31. The readout of signals from the register 25 is nondestructive, and therefore, the quantity, $f(x_n)$ will be stored both in the accumulator 31 and in the register 25.

After the initial operations of entering quantities in the registers 25, 26 and 29 and in the accumulator 31, the multiplier register 29 is examined digit by digit by a senssing circuit 32, and one or the other of the add gates 33 and 34 will be conditioned to selectively pass either the quantity $f(x_n)$ from the register 25 or the quantity $f(x_{n+1})$ from the register 26. An adder 35 adds the selected function value, $f(x_n)$ or $f(x_{n+1})$ to the contents of the accumulator 31 to establish a partial product in another accumulator 36. After the first addition step, the contents of the accumulator 36 are transferred from the accumulator 36 to the accumulator 31 by transfer gates 37. The accumulators 31 and 36 are coupled together via the transfer gates 37 such that a right shift is accomplished during the transfer operation. After each addition, the partial product is right shifted and entered into the accumulator 31 and the multiplier register 29 is also right shifted. The interpolation continues with further selective additions of the multiplicand quantities in accordance with the examination of further multiplier digits. After each addition, both the partial product and the multiplier quantities are right shifted until the examination of all of the multiplier digits has been completed, whereupon the accumulator 31 will contain output signals representing the interpolated function value, $f(x)$.

Figure 4:
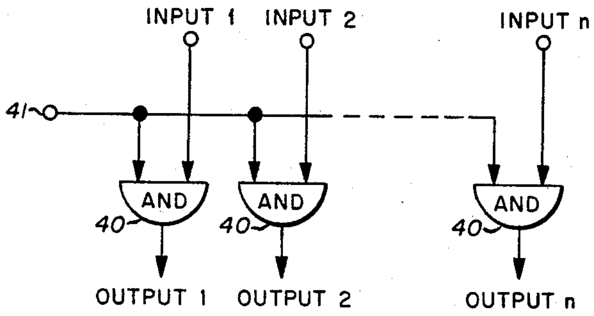
FIGURE 4 is a circuit diagram of a gating arrangement for passing parallel signals as shown by certain blocks in FIGURE 1.

The computing apparatus illustrated in FIGURE 1 passes and operates upon signals in parallel. Thus, a plurality of input signals are entered into one of the $x$, $y$ or $z$ registers 13, 14 or 15 simultaneously over a plurality of parallel input leads. Similarly, signals received from the storage device 12 are passed simultaneously, via multiple leads to a group of read amplifiers shown collectively as a single box 39; and thence the signals may be passed via appropriate groups of gates 21 or 23 into registers 25 and 26. The multiplicity of parallel leads between the various computer components or boxes shown in FIGURE 1 are indicated by a double line notation. Thus, it will be understood that the various paths of FIGURE 1 shown by double lines are in effect a plurality of parallel leads for passing simultaneous signals. The various transfer gates such as 21, 23, 28, 33 and 34 shown by FIGURE 1 are in reality a plurality of AND gates 40 as shown in FIGURE 4. In the AND gates of FIGURE 4, a conditioning voltage may be impressed upon a lead 41 whereupon all of the gates 40 will be conditioned to pass signals between input terminals and respective output terminals. Each of the AND gates 40 may be of conventional design, as for example, the diode gate arrangement shown on page 32 of a textbook entitled "Arithmetical Operations In Digital Computers" by R. K. Richards published by the D. Van Nostrand Company.

Figure 5:
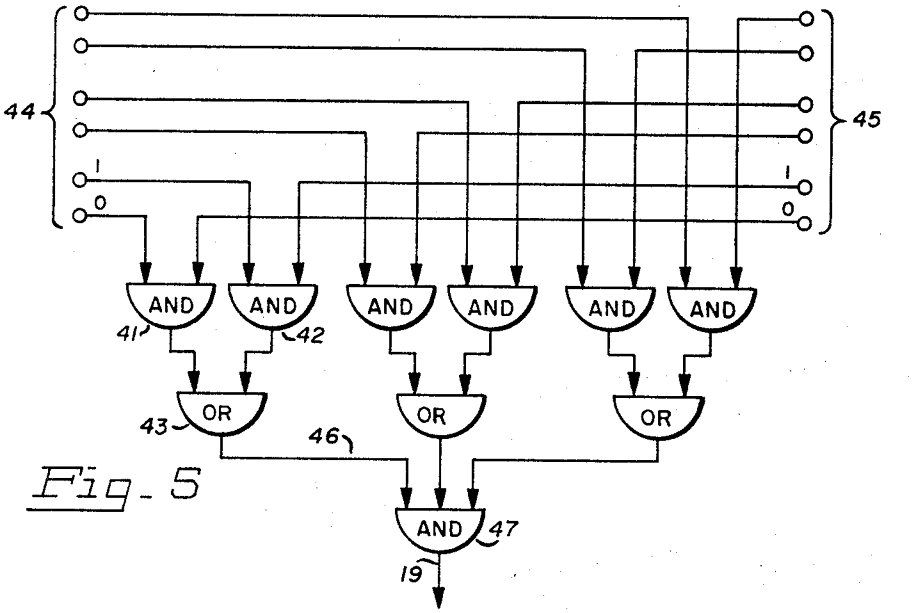
FIGURE 5 is a diagram of an identity comparator circuit which may be used as certain blocks shown in FIGURE 1.

The identity comparators 18 may be as shown by FIGURE 5 wherein AND and OR gates are grouped as shown by the AND gates 41 and 42 and an OR gate 43. Each AND gate is coupled to corresponding input terminals for sensing the binary digits from a group of leads 44 coupled to the more significant bits of the $x$ register 13 and a further group of leads 45 coupled to the word counter 17. Each group of two AND gates 41 and 42 and an OR gate 43 constitute an "exclusive OR" circuit for passing a signal to an output lead 46 when there is an identity between signals from a pair of input leads 44 and a corresponding pair of input leads 45. A final AND gate 47 is coupled to each of the exclusive OR circuits, and will pass a signal to the output lead 19 when signals are received from all of the exclusive OR circuits indicating that all of the input signals of the leads 44 are identical to the input signals of the leads 45. Thus, the most significant bits of the $x$ input signal is determined to be identical to the count of the word counter 17.

Figure 3:
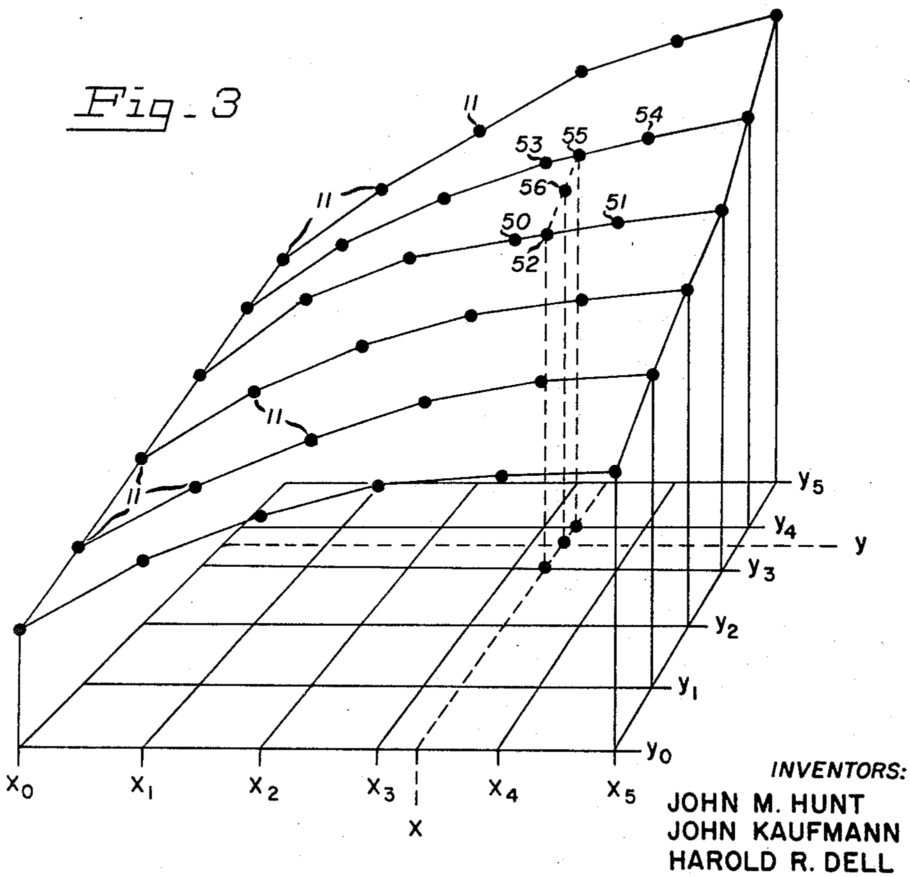
FIGURE 3 is a three-dimensional, graphical representation illustrating a function of two variables and the relation between the stored point values, the input quantities, and the output function quantities.

As indicated heretofore, the computer of this invention will provide an output signal which is a function of 1, 2 or 3 variables represented by input signals $x$, $y$ and $z$. FIGURE 2 shows a sample function of a single variable, and an output signal $f(x)$ may be obtained by one interpolation between the function values of the bracketing points 22 and 24 to obtain the function value of the interpolated point 49. FIGURE 3 shows in three-dimensions, a function of two variables, $x$ and $y$. To obtain an output signal from a function of two variables as shown in FIGURE 3, a first interpolation may be made between the function values of a pair of bracketing points 50 and 51 to obtain an intermediate signal representative of the function value of an interpolated point 52. A second interpolation may be made between the function values of a pair of bracketing points 53 and 54 to obtain a second signal representative of the function value at an intermediate point 55. A third and final interpolation may be then made between the function values of the points 52 and 55 to obtain an output signal corresponding to the function value at a final interpolation point 56.

A function of three variables cannot be graphically represented in a satisfactory manner as shown in FIGURES 2 or 3, but this case may be understood by considering that the function of three variables exist in a series of pages of curves each of which is similar to FIGURE 3. Each page may in itself resemble FIGURE 3, but the variout points thereof may depart from the values of the points of adjacent pages. The apparatus of this invention may determine the final value of the function by making four initial interpolations between adjacent pages to obtain points corresponding to 50, 51, 53 and 54 of FIGURE 3. In this case, the FIGURE 3 representation may itself be considered as an interpolation between two adjacent pages which are not shown but which will be understood to be of a similar configuration. After the first four interpolation operations, the function of three variables is effectively reduced to a function of two variables, and the final output signal may be obtained therefrom in accordance with the steps outlined in the above paragraph. Obviously, this invention may conceivably be employed for obtaining functions of more then three variables by increasing the sets of pages which would be required.

As shown by FIGURE 1, the various signals representative of the various points are continuously reproduced by the read amplifiers 39 from the storage drum or device 12. The word counter 17 will advance by one count as the data for each point is reproduced by the read amplifiers 39. After all of the point values for a single function curve have been passed, the word counter 17 will return to a zero count, a signal will be generated for advancing a curve counter 58. As the drum storage device 12 continues to pass signals representative of continuing points of further curves, the curve counter will eventually return to a zero count, and an advance pulse will be passed to a page counter 59. The various identity comparators 18 will therefore compare the $x$ input with the condition of the word counter 17, the $y$ input with the condition of the curve counter 58 and the $z$ input with the page counter 59 Obviously, for functions of two variables, the page countei 59 and register 15 will be unnecessary; and for functions of a single variable, neither the curve counter 58 nor the page counter 59, nor the registers 14 and 15 will be necessary.

Figure 6:
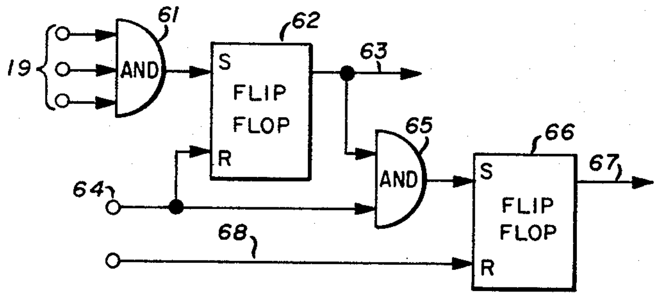
FIGURE 6 is a diagram of a loading logic circuit which may be used as a block shown in FIGURE 1.

The $f(x_n)$ and $f(x_{n+1})$ loading logic circuits 20 are operable to condition the input gates 21 or 23 to receive the signal representative of the function at those points wherein the more significant bits in the $x$, $y$ and $z$ registers become identical to the count stored in the counters 17, 58 and 59. FIGURE 6 indicates a simplified arrangement of the logic circuits 20. The leads 19 from the identity comparators may be passed to an appropriate gate 61. When identity has been established, a flip-flop circuit 62 is set to provide a voltage on a lead 63 for conditioning the $f(x_n)$ input gates 21 for passing signals. Timing or clock pulses originating from the magnetic drum 12 are impressed upon a lead 64 such that the flip-flop 62 will be re-set after the function point data has been read from the drum 12 and passed through the input gate 21. The same timing pulse on the lead 64 will be passed via an AND gate 65, to set a second flip-flop 66 which will provide a voltage on a lead 67 for conditioning the $f(x_{n+1})$ input gates 23. During the next time interval, signals representative of the point $f(x_{n+1})$ will be passed through the gates 23 and thence a further timing pulse will appear on a lead 68 to re-set the flip-flop 66 and remove the conditioning voltage from the gates 23. As indicated heretofore, the identity comparator circuits compare the most significant binary digits of the input signal with the binary count of the stored words or funcion points to obtain the first bracketing point, $x_n$ ($x_5$ as shown in FIGURE 2), which is entered into the registed 25. The loading logic circuitry 20 not only causes the data representative of the point 22 to be loaded into the register 25, but the next subsequent data corresponding to the point 24 will then be loaded into the register 26. Thus, the two bracketing points appearing on each side of the input value $x$ will be placed in the registers 25 and 26 respectively.

As previously indicated, the general formula for obtaining the value of a function by linear interpolation is as follows:

$$(1)\qquad f(x)=\frac{x-x_n}{x_{n+1}-x_n}[f(x_{n+1})-f(x)]+f(x_n)$$

where $x$ is the input quantity, $x_n$, and $x_{n+1}$ are the values of the independent variables at the points which bracket the quantity $x$, $f(x_n)$ and $f(x_{n+1})$ are the dependent function values of the bracketing points, and $f(x)$ is the desired function value corresponding to the input quantity $x$. A solution for the above equation calls for three initial subtraction steps, a division step, a multiplication step and a final addition step. Equation (1) may be simplified when we recognize that the divisor quantity $(x_{n+1}-x_n)$ represents the increments or spacing along the abscissa between adjacent points on the function curve (see FIGURE 2). As previously indicated, the points have been equally spaced along the abscissa, and therefore, the quantity $(x_{n+1}-x_n)$ will be a constant. If this constant divisor is considered equal to unity, the division step is eliminated.

With the divisor established as unit, equation (1) may be simplified as follows:

$$(2)\qquad f(x)=(x-x_n)[f(x_{n+1})-f(x_n)]+f(x_n)$$

Equation (2) may be expanded and written as follows:

$$(3)\qquad f(x)=f(x_{n+1})\cdot(x-x_n)-f(x_n)\cdot(x-x_n)+f(x_n)$$

Factoring the quantity $f(x_n)$ in the last two terms, we may obtain the equation:

$$(4)\qquad f(x)=f(x_{n+1})\cdot(x-x_n)+f(x_n)[1-(x-x_n)]$$

It may be noted that the quantity $1-(x-x_n)$ is the 2's complement of the quantity $(x-x_n)$. This quantity may be converted into the 1's complement of $(x-x_n)$ by subtracting therefrom the value of the least significant binary digit $(1/2^m)$ where $m$ is the number of binary digits in the multiplier quantity.

$$(5)\qquad f(x)=f(x_{n+1})\cdot(x-x_n)+f(x_n)\cdot[(1-1/2^m)-(x-x_n)]+f(x_n)\cdot 1/2^m$$

From the above, it will be appreciated that the desired output function $f(x)$ is equal to the summation of three quantities which are the terms of Equation 5. The first term, $f(x_{n+1})\cdot(x-x_n)$, is the binary product between a multiplier quantity $(x-x_n)$, and the function value of the second bracketing point from the function curve, $f(x_{n+1})$. This term could be computed by conventional computer multiplication of repeated selective additions and right shifting of the multiplicand quantity, $f(x_{n+1})$. In such a multiplication step, the multiplier quantity, $x-x_n$, would be examined digit by digit, and the multiplicand quantity, $f(x_{n+1})$ will be added and right shifted each time the multiplier digit appears as a binary one; but the multiplicand quantity will not be added when the multiplier digit appears as a binary zero. The second term of the Equation 5 may be obtained by similar selective additions and register shifting. Since the multiplier $$[(1-1/2^m)-(x-x_n)]$$

for the second term is the 1's complement of the quantity $x-x_n$, the multiplicand quantity $f(x_n)$ will be added each time the multiplier quantity appears as a zero, and no addition will be made for those times that the multiplier appears as a one.

It may now be appreciated that a combined value for two terms of Equation 5

$$f(x_{n+1})\cdot(x-x_n)+f(x_n)\cdot[(1-1/2^m)-(x-x_n)]$$

may be developed in a single multiplication step. The two multiplicand quantities, $f(x_{n+1})$ and $f(x_n)$ may be entered into separate registers and the multitplier quantity, $x-x_n$, may be entered into a multiplier register. The multiplier quantity is then interrogated digit by digit. Each time the multiplier digit appears as a binary 1, the first multiplicand quantity, $f(x_{n+1})$, will be added into the partial product; and each time the multiplier digit appears as a binary zero the other multiplicand quantity, $f(x_n)$ will be added into the partial product. After each addition, the product register or accumulator may be right shifted in preparation for the next multiplicand addition.

The third and final term of Equation 5, $f(x_n)\cdot 1/2^m$, represents the product of the multiplicand quantity $f(x_n)$ times the fraction, $1/2^m$. This multiplication may be performed by entering the multiplicand quantity $f(x_n)$, into an accumulator or register and then right shifting the register $m$ times, where $m$ is the number of digits of the multiplier. This product may be developed in the product register by entering the multiplicand quantity $f(x_n)$ into the register or accumulator at the beginning of the multiplication operation. During this operation, the further multiplicand quantities will be added into the product register in accordance with the multiplier quantity and the product register will be right shifted after each addition. In other words, the multiplicand quantity, $f(x_n)$, is entered into the product register initially, and then the further multiplication operations cause the quantity to be right shifted a repeated number of times equal to the number of digits of the multiplier quantity, whereby no further operations need be performed thereon.

As an alternative method of computation, the initial step of transferring the quantity, $f(x_n)$ from the multiplicand register 25 to the accumulator 31 may be accomplished by entering a binary 0 into the multiplier register 29 as the least significant binary digit thereof. If we consider that the multiplier quantity is a binary fraction, the addition of one further bit need not affect the value of those other multiplier bits which are transferred to the register 29 via the gates 28. If the multiplier register always commences with the binary 0, the accumulator 31 may be cleared and the first addition step will effectively enter the quantity $f(x_n)$ into the accumulator through the adder 35.

As indicated heretofore, the three most significant digits of the input quantities are used by the identity comparators to select bracketing quantities $f(x_n)$ and $f(x_{n+1})$ for the registers 25 and 26. Meanwhile, the input digits of lesser significance are entered into the multiplier register 29. The multiplier sensing circuit 32 may be a simple flip-flop or bi-stable circuit which will be established in a first conduction state when the least significant bit of the multiplier register 29 is a binary 1; and will be established in a second conduction state when the least significant multiplier bit appears as a binary 0. The two output leads from the flip-flop 32 are coupled to respective ones of the gates 33 and 34 such that a first set of inputs of the parallel adder 35 will be coupled to either the register 25 or the register 26 as determined by the conduction state of the flip-flop 32. The interpolation operation is commenced by an initial add pulse applied to the transfer gates 30 whereupon the multiplicand quantity of $f(x_n)$ will be entered into the second accumulator 31. This initial step combined with the subsequent right shifting which will take place in conjunction with the successive additions will provide for the third term quantity, $f(x_n)\cdot 1/2^m$ of Equation 5 above. After the initial addition, either the gates 33 or the gates 34 will be conditioned to pass signals depending upon the least significant bit stored by the multiplier register 29. The contents of the accumulator 31 and the selected one of the registers 25 or 26 are then added by the adder circuit 35, and will be passed by a set of transfer gates 70 into the accumulator 36. Subsequently, the partial product of the accumulator 36 is passed to the second accumulator 31 in preparation of the next addition step. The transfer gates 37 and 70 are rendered operable at different times during the cycle of operation as indicated by the designation $\phi_A$ and $\phi_B$. In this arithmetic circuit, the use of the two accumulators 36 and 31 assures stability in the addition operations. Since the transfer gates 70 and 37 are not "open," simultaneously, there will be no closed loop situation which could otherwise occur with the accumulator 31 setting its contents into the adder 35 and thence into accumulator 36 and continuing on to the initial accumulator 31. Obviously, the contents of the accumulator 31 may be passed through the adder together with a further multiplicand quantity to establish the accumulator 36 in a stable state; and then as a second step, the contents of the accumulator 36 may be passed on to the accumulator 31. The right shift operation may be accomplished as the contents of the accumulator 36 are passed to the accumulator 31. During this transfer the least significant binary digit from the accumulator 36 may be passed into the multiplier register 29 while the other binary digits may be passed to the accumulator 31.

As the multiplier register 29 is being right shifted with each successive addition steps, the least significant digit remaining in the multiplier register is sensed by the circuit 32 and then the register is right shifted, discarding that digit and setting the next digit into the least significant storage unit of the register 29. As the digits of the multiplier are shifted to the right, sensed, and discarded, further digits from the accumulator 36 will be entered into the vacated storage units of the register 29. After all of the successive additions have been accomplished, the digits of the multiplier will have all been examined and discarded from the register 29, and the least significant digits of the product quantity will then occupy this register. The most significant digits of the product will appear in the accumulator 31. In a final transfer operation, a set of output gates 72 will pass all of the desired product digits to output terminals 73. Obviously, a round off may be effected in which any or all of the least significant digits appearing in the register 29 may be discarded. Indeed, if it is not desired to carry the product output quantity to any greater accuracy than the input quantities, the multiplier regiser need not be used for storing the least significant binary digit, and the contents of the accumulator 31 will represent the product quantity.

In the event that it is desired to obtain a function of two or more variables, several interpolation operations must be accomplished as discussed above in connection with FIGURE 3. After the first interpolation operation, the contents of the accumulator 31 may be passed to an intermediate register 74 via a group of input gates 75. The intermediate register 74 will then retain the result of the first interpolation while a second interpolation is accomplished. The quantity obtained from the second interpolation may thence be passed via gates 76 to a further register 77 and thence by transfer gates 78 to the multiplicand register 26. Similarly, the contents of the register 74 may be passed via gates 79 to the other multiplicand register 25, and a final interpolation operation may be accomplished. If it is desired to obtain a function of three variables, a first interpolation may be accomplished and the results stored in the register 74. A second interpolation may be accomplished and the results stored in the register 77. A third interpolation may thence be accomplished between the contents of the registers 74 and 77 and the resulting signals may be again stored in the register 74. A fourth interpolation may provide signals which will be stored in the register 77, a fifth interpolation may thence be accomplished whereupon the results will be initially stored in the accumulator 31. For the sixth interpolation, the contents of the register 74 and 77 may be passed respectively to the registers 25 and 26; and thence the contents of the accumulator 31 may be passed to the register 74. The seventh and final interpolation may be then passed via the output gates 72 to the output terminals 73.

In a special purpose computer such as an aircraft flight simulator, the output signals to be generated may be functions of 1, 2 or 3 variables, and may be computed as indicated heretofore. Many of these functions have been empirically derived from observed data, and have been found to be continuous curves with no discontinuities, abrupt changes or sharp peaks over the working range for which function values must be derived. It has been found that linear or straight line interpolations between adjacent breakpoints of the recorded function will provide desired output signals having an accuracy of 12 to 14 binary places which is the equivalent to an error of approximately .01%. Therefore, it may be appreciated that the necessity of representing functions as a series of straight line segments equally spaced along the abscissa does not introduce undue error into the computations.

As illustrated by FIGURE 2, each of the functions may be recorded with the values of 9 breakpoints to provide 8 linear segments. Since the three most significant digits provide 8 binary combinations as indicated by FIGURE 2, each of the line segments may be identified with the values of $x_0$ through $x_7$ which correspond to the binary numbers 000 through 111. Obviously, this method of computation may be extended to provide greater accuracy with additional recorded breakpoint values. For example, the function curves may have 17 breakpoints establishing 16 linear segments which may be identified with the 16 binary combinations established by the four most significant digits of the input signals.

Changes may be made in the form, construction and arrangement of the parts without departing from the spirit of the invention or sacrificing any of its advantages, and the right is hereby reserved to make all such changes as fall fairly within the scope of the following claims.

The invention may be claimed as follows:

1. Computing apparatus for generating output signals corresponding to the value of a pre-determined function of an independent quantity which is represented by binary coded input signals, said apparatus comprising a storage means wherein values of the function are recorded corresponding to points which are spaced uniformly with respect to the independent quantity, amplifier means for reproducing the function point values from storage as binary coded words, counting means associated with the amplifier means for providing a numerical count of the words reproduced from storage, an input register means for receiving and storing the binary coded input signals, comparator means coupled to the input register means and to the counting means for comparting the most significant binary digits of the input signals with the numerical count from the counting means, gating means responsively coupled to the comparator means and operable to pass the reproduced function values representative of the points of the function which bracket the input signal, a first multiplicand register means and a second multiplicand register means coupled to the gating means for receiving and storing the values of the bracketing function points, a multiplier register means coupled to receive the binary digits of lesser significance from the input register means, and an adder coupled to the first and second multiplicand registers and operable to selectively add the quantities from the first or second multiplicand registers in accordance with the least significant binary digit which is stored in the multiplier register.

2. Computing apparatus for generating output signals corresponding to the value of a pre-determined function of an independent quantity which is represented by binary coded input signals, said apparatus comprising a storage means wherein values of the function are recorded corresponding to points which are spaced uniformly with respect to the independent quantity, amplifier means for reproducing the function point values from the storage means as binary coded words, counting means associated with the amplifier means for providing a numerical count of the words reproduced from the storage means, an input register means for receiving and storing the binary coded input signals, comparator means coupled to the input register means and to the counting means for comparing the most significant binary digits of the input signals with the numerical count from the counting means, a first multiplicand register and a second multiplicand register, gating means responsively coupled to the comparator means and coupled between the amplifier means and the first and second multiplicand registers, said gating means being operable to pass signals representative of the value of a first bracketing point of the function to the first multiplicand register and being further operable to pass signals representative of a second bracketing point of the function to the second multiplicand register, a multiplier register coupled to receive the binary digits of lesser significance from the input register means, a sensing means coupled to the multiplier register for sensing the least significant binary digit therein, an adder circuit, and gating means responsively coupled to the multiplier sensing means and operable to pass signals selectively from the first and second multiplicand registers to the adder in accordance with the least significant binary digit stored in the multiplier register.

3. Computing apparatus for generating output signals corresponding to the value of a pre-determined function of an independent quantity which is represented by a plurality of binary coded input signals received in parallel, said apparatus comprising a storage means wherein values of the function are recorded corresponding to points which are spaced uniformly with respect to the independent quantity, amplifier means for reproducing successive point values of the function from the storage means, each function point value being reproduced as binary coded words wherein binary digits are reproduced in parallel, counting means coupled to the amplifier means for providing a numerical count of the words reproduced from the storage means, an input register for receiving and storing the input signals in parallel, a comparator coupled to the input register and to the counting means for comparing the most significant binary digits of the input signals with the numerical count of the reproduced binary coded words, a first multiplicand register and a second multiplicand register for receiving and storing respective binary words in parallel, gating means responsively coupled to the comparator and operable to pass a first selected binary coded word from the amplifying means to the first multiplicand register and being further operable to pass the next successively reproduced binary coded word from the amplifying means to the second multiplicand register, a multiplier register coupled to the input register for receiving and storing the binary digits of lesser significance of the input signals, a parallel adder, an accumulator means coupled to the adder and operable to receive and store a binary coded signal in parallel constituting a partial product quantity, gating means coupled between the first multiplicand register and the accumulator for initially entering the value of the first bracketing function point into the accumulator, selective gating means responsively coupled to the multiplier register and operable to pass a quantity from a selected one of the multiplicand registers in accordance with a value stored in the multiplier register.

4. Computing apparatus for generating an output signal corresponding to an interpolated value between two multiplicand quantities which are the values of function points bracketing the value of an independent quantity represented by an input signal, said apparatus comprising a first multiplicand register and a second multiplicand register for receiving and storing the respective multiplicand quantities, a multiplier register for receiving and storing the input signal which constitutes a multiplier quantity, means for successively impressing successive portions of the multiplier quantity on an output of said multiplier register, selective gating means controllably coupled to the multiplier register and responsive to one value of a respective portion of the input signal at an output of said multiplier register for selecting and passing the multiplicand quantity from said first multiplicand register and responsive to another value of a respective portion of the input signal at an output of said multiplier register for selecting and passing the multiplicand quantity from said second multiplicand register therethrough, an adder circuit, and an output accumulator means coupled to receive signals from the adder circuit, said adder circuit being coupled to the selective gating means and to the output accumulator means and being operable to make successive additions of selected multiplicand quantities to develop a product quantity in the output accumulator means.

5. Computing apparatus for generating an output signal corresponding to an interpolated value between two multiplicand quantities which are the values of function points bracketing the value of an independent quantity represented by a binary input signal, said apparatus comprising a first multiplicand register and a second multiplicand register for receiving and storing the respective multiplicand quantities, a multiplier register for receiving and storing a portion of the input signal which constitutes a multiplier quantity, a multiplier sensing means responsively coupled to the multiplier register for determining the value of each binary digit stored therein, selective gating means responsively coupled to the multiplier sensing means for selecting and passing the multiplicand quantity from said multiplicand register in response to one value of each binary digit of the multiplier quantity sensed by the multiplier sensing means and for selecting and passing the multiplicand quantity from said second multiplicand register in response to another value of each binary digit of the multiplier quantity sensed by the multiplier sensing means, an adder circuit, an output accumulator means coupled to receive partial product signals from the adder circuit, said adder circuit being coupled to the selective gating means and to the output accumulator means and being operable to make successive additions of the partial product with the selected multiplicand quantities to develop further partial products, means for shifting the multiplier register with each successive addition to provide another least significant digit to be sensed, and means for shifting the partial product in the accumulator means between each successive addition step.

6. The computing apparatus in accordance with claim 5 wherein the output accumulator means comprises a first accumulator circuit and a second accumulator circuit, a first group of first transfer gates coupled between the adder and the first accumulator circuit and being operative during the intervals of successive additions by the adder circuit, and a second group of transfer gates coupled between the first accumulator circuit, and the second accumulator circuit and being operative during intervals between the successive additions of the adder, said second transfer gates further comprising a means for shifting the partial product quantity by one binary digit as the partial product quantity is transferred from the first accumulator to the second accumulator.

7. The computing apparatus in accordance with claim 6 further comprising, transfer gates coupled between the first multiplicand register and the second accumulator circuit, said transfer gates being operable to enter the value of the first bracketing function point into the output accumulator means at an initial time during a computing cycle whereby the value of the first bracketing point will be successively right shifted during the interpolation operation and will be added to the final partial product.

8. Computing apparatus for generating output signals corresponding to the value of a pre-determined function of a plurality of independent quantities each of which is represented by respective binary coded input signals, said apparatus comprising a storage means wherein values of the function are recorded corresponding to points which are spaced uniformly with respect to the independent quantities, said function point values being recorded as a plurality of successive function curves, amplifying means for reproducing the function point values from the storage means as binary coded words, a first counting means coupled to the amplifying means for providing a numerical count of the words reproduced from the storage means, a second counting means coupled to the first counting means for providing a numerical count of the curves reproduced from the storage means, a plurality of input register means for receiving and storing the plurality of binary coded input signals respectively, a first comparator means coupled between the first counting means and a first of the input register means for comparing the most significant binary digits of a first of the input signals with the numerical count of the first counting means, a second comparator means coupled between the second counting means and another of the input register means for comparing the most significant binary digits of a second of the input signals with the numerical count of the second counting means, a first multiplicand register and a second multiplicand register, gating means responsively coupled to the plurality of comparator means and coupled between the amplifier means and the first and second multiplicand registers, said gating means being operable to pass signals representative of the value of a first bracketing point of the function to the first multiplicand register and being further operable to pass signals representative of a second bracketing point of the function to the second multiplicand register, a multiplier register coupled to receive the binary digits of lesser significance from one of the input register means, a sensing means coupled to the multiplier register for sensing the least significant binary digit therein, an adder circuit, and gating means responsively coupled to the multiplier sensing means and operable to pass signals selectively from the first and second multiplicand registers to the adder in accordance with the least significant binary digit stored in the multiplier register.

9. A digital computer for interpolating function values between pairs of bracketing function values received from a memory which stores function values for certain abscissa points of an independent variable comprising a multiplier register for said independent variable, two multiplicand registers for holding a pair of said bracketing function values, a product accumulator, transfer gates connected between one of said multiplicand registers and said product accumulator, an adder connected to said product accumulator, and a sensing circuit including means for interrogating said multiplier register and for connecting said multiplicand registers to said adder, characterized in that, in successive steps, first the content of one of said multiplicand registers is copied via said transfer gates into said product accumulator, then said multiplier register is interrogated bit-wise with said sensing circuit and, depending on each answer one or the other of said multiplicands is added by said adder to the content of said product accumulator and the partial result produced after each step is shifted one place to the right.

10. An interpolation computer as defined by claim 9 characterized in that the stored function values belong to equidistant abscissa points and the multiplier register receives only the least significant bits of said independent variable.

11. An interpolation computer as defined by claim 9 characterized in that there are two product accumulators of which the content of the first is shifted one place by transfer gates at determined times upon being delivered to the second which on its part may at other times add on to the content of the first by means of the transfer gates and the adder.

12. An interpolation computer as defined by claim 9 characterized by bit-wise shifting of the contents of the multiplier register with each calculating step and the transfer of the least significant bits shifted out of the accumulator and into the vacated spaces in the multiplier register.

13. Apparatus for generating output signals corresponding to a value of a predetermined function of an independent quantity, the value of said quantity being represented by binary coded input signals indicative of a plurality of bits of varying degrees of significance, said apparatus comprising: means for recording numbers representative of values of said predetermined function at equal increments of said independent quantity, means for reproducing in accordance with the more significant digits of said input signals the two of said numbers representing values of said function for the two increments of said quantity bracketing said input signals, and means for interpolating between said two numbers in accordance with said digits of lesser significance of said input signal by successively adding selected ones of said numbers in accordance with the values of successive ones of said digits of lesser significance.

14. Apparatus for generating output signals corresponding to a value of a predetermined function of an independent variable quantity, said quantity being represented by binary input signals indicative of a plurality of binary bits of varying degrees of significance, said apparatus comprising: a first multiplicand register and a second multiplicand register, means for entering numbers representative of the value of said function at a first point of said quantity, means for entering into said second register a second number representative of the value of said function at a second point of said independent quantity, a muliplier register, means for entering into said multiplier register said input signals, means for sensing said multiplier register bit-by-bit and an adder for successively adding one or the other of said numbers in accordance with the bits sensed in said multiplier register and for accumulating the partial sums in a product register.

15. Apparatus for generating output signals corresponding to a value of a predetermined function of an independently variable quantity, said quantity being represented by binary input signals indicative of a plurality of binary bits of varying degree of significance, said apparatus comprising: a first multiplicand register and a second multiplicand register, means for entering into said first multiplicand register a first number which is the value of said function at a first of two points bracketing said quantity, means for entering into said second multiplicand register a second number which is the value of said function at said second point, a multiplier register, means for entering said input signals into said multiplier reigister, means for transferring said first number into a product accumulator, means for sensing said multiplier register bit-by-bit and for successively adding one or the other of said numbers to the partial sum contained in said product accumulator in accordance with the bits sensed in said multiplier register, and for right shifting said partial sum between each successive such addition.

16. Computing apparatus for generating output signals corresponding to a particular value of a pre-determined function of an independently variable quantity represented by digital input signals which represent a plurality of digits of varying significance, said apparatus comprising storage means wherein are recorded values of said function for uniformly spaced points of said independent quantity, means for reproducing said recorded values from said storage means in a series of data words, counting means for counting the words so reproduced, first register means for receiving and storing said digital input signals, comparator means coupled to said first register means and to said counting means for comparing the most significant digits of said input signal with the number accumulated by said counting means, gating means responsively coupled to said comparator means and coupled to said reproducing means for passing two of said recorded values corresponding to respective points of said quantity which bracket said input signals, second register means and a third register means coupled to said gating means for receiving and storing said two values, and means responsive to the least significant digits of said input signal for selectively receiving from said second and third register means said two values and for selectively adding said two values to produce said output signals.

17. Computing apparatus for generating output signals corresponding to a particular value of a pre-determined function of an independently variable quantity represented by binary input signals, said apparatus comprising a first multiplicand register; means for entering signals representative of a first point of the pre-determined function into the multiplicand register; a second multiplicand register; means for entering signals representative of a second point of the pre-determined function into the second multiplicand register; a multiplier register; means for entering input signals representing a particular value of the independent quantity into the multiplier register; sensing means responsively coupled to the multiplier register for sensing the signal therein bit by bit; said sensing means being controllably coupled to the first and second multiplicand registers for passing signals from one multiplicand register or the other in accordance with the bit values of the signal in the multiplier register.

References Cited

UNITED STATES PATENTS

| | | | |
|---|---|---|---|
| 2,833,941 | 5/1958 | Rosenberg et al. | 235—152 |
| 3,018,045 | 1/1962 | Poland | 235—150.53 |
| 3,033,456 | 5/1962 | Kramskoy | 235—164 |
| 3,159,739 | 12/1964 | Deerfield | 235—164 |
| 3,163,749 | 12/1964 | Roth et al. | 235—164 |
| 3,164,807 | 1/1965 | Reque | 235—150.53 |
| 3,202,805 | 8/1965 | Amdahl et al. | 235—164 |
| 3,235,713 | 2/1966 | Stern | 235—164 |
| 3,247,365 | 4/1966 | Dell et al. | 235—152 |
| 3,256,424 | 6/1966 | Gotz | 235—152 |

OTHER REFERENCES

Johnson, E. C., Interpolation—A Link Between Programmed Points and Smooth Curves, in Control Engineering, September 1958, pp. 153–157.

Henegar, H. B., New Continuous Path System Uses DDA Interpolator, in Control Engineering, January 1961, pp. 71–76.

MALCOLM A. MORRISON, *Primary Examiner.*

F. D. GRUBER, *Assistant Examiner.*